US010831989B2

(12) United States Patent
Takahashi et al.

(10) Patent No.: US 10,831,989 B2
(45) Date of Patent: Nov. 10, 2020

(54) DISTRIBUTING UPDATED COMMUNICATIONS TO VIEWERS OF PRIOR VERSIONS OF THE COMMUNICATIONS

(71) Applicant: International Business Machines Corporation, Armonk, NY (US)

(72) Inventors: Takashi Takahashi, Shinjyuku-ku (JP); Yoshio Horiuchi, Hiratsuka (JP); Masahiro Okawa, Kashiwa (JP); Yuriko Nishikawa, Koto-ku (JP); Kazuto Yamafuji, Ichigao-cho Aoba-ku (JP)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 16/208,850

(22) Filed: Dec. 4, 2018

(65) Prior Publication Data

US 2020/0175098 A1 Jun. 4, 2020

(51) Int. Cl.
*G06F 40/166* (2020.01)
*G06F 16/332* (2019.01)
(Continued)

(52) U.S. Cl.
CPC ........ *G06F 40/166* (2020.01); *G06F 16/3329* (2019.01); *G06F 40/58* (2020.01); *H04L 51/02* (2013.01); *H04L 51/063* (2013.01)

(58) Field of Classification Search
CPC .... G06F 40/166; G06F 40/58; G06F 16/3329; H04L 51/063; H04L 51/02; H04L 12/1813
See application file for complete search history.

(56) References Cited

U.S. PATENT DOCUMENTS

| | | |
|---|---|---|
| 5,751,378 A | 5/1998 | Chen |
| 6,071,236 A | 6/2000 | Iliff |

(Continued)

FOREIGN PATENT DOCUMENTS

| | | |
|---|---|---|
| JP | 2002/049786 A | 2/2002 |
| JP | 2006252382 A | 9/2006 |

(Continued)

OTHER PUBLICATIONS

Suzuki et al., "Extraction of Correspondences between Questions and Answers from Web Message Boards", https://www.jstage.jst.go.jp/article/tjsai/25/1/25_1_168/_article, Japanese Society for Artificial Intelligence, vol. 25, Issue 1, 2010, article overview, 2 pages.

(Continued)

*Primary Examiner* — Yogeshkumar Patel
(74) *Attorney, Agent, or Firm* — Richard Wilhelm; Edell, Shapiro & Finnan, LLC

(57) ABSTRACT

According to one embodiment of the present invention, a system distributes communications and includes at least one processor. The system identifies an answer to a question submitted to the system by a requesting user. A responding user is identified that submitted the identified answer to the system. The system enables the responding user to view the identified answer. In response to receiving a revision to the identified answer from the responding user, one or more users that have viewed the identified answer are determined and notified of the revision to the answer. Embodiments of the present invention further include a method and computer program product for distributing communications in substantially the same manner described above.

20 Claims, 9 Drawing Sheets

(51) Int. Cl.
*H04L 12/58* (2006.01)
*G06F 40/58* (2020.01)

(56) References Cited

U.S. PATENT DOCUMENTS

| | | | |
|---|---|---|---|
| 6,542,889 | B1 | 4/2003 | Aggarwal |
| 7,225,187 | B2 | 5/2007 | Dumais |
| 7,295,965 | B2 | 11/2007 | Haigh |
| 7,594,176 | B1 | 9/2009 | English |
| 7,743,340 | B2 | 6/2010 | Horvitz |
| 7,945,525 | B2 | 5/2011 | Ananthanarayanan et al. |
| 7,958,457 | B1 | 6/2011 | Brandenberg |
| 8,254,685 | B2 | 8/2012 | Greene |
| 8,275,803 | B2 | 9/2012 | Brown |
| 8,402,054 | B2 | 3/2013 | Frazier et al. |
| 8,429,179 | B1 | 4/2013 | Mirhaji |
| 8,510,296 | B2 | 8/2013 | Fan |
| 8,538,744 | B2 | 9/2013 | Roberts |
| 8,555,281 | B1 | 10/2013 | Van Dijk |
| 8,600,986 | B2 | 12/2013 | Fan |
| 8,626,784 | B2 | 1/2014 | Beaudreau |
| 8,636,515 | B2 | 1/2014 | Burgin |
| 8,706,653 | B2 | 4/2014 | Kasneci |
| 8,935,277 | B2 | 1/2015 | Kuchmann-Beauger |
| 9,141,662 | B2 | 9/2015 | Clark et al. |
| 9,558,507 | B2 | 1/2017 | Zilkha |
| 9,582,757 | B1 | 2/2017 | Holmes |
| 9,619,513 | B2 | 4/2017 | Bradley et al. |
| 9,785,684 | B2 | 10/2017 | Allen et al. |
| 9,912,736 | B2 | 3/2018 | Allen et al. |
| 10,152,534 | B2 | 12/2018 | Bastide et al. |
| 10,169,326 | B2 | 1/2019 | Allen et al. |
| 10,169,327 | B2 | 1/2019 | Allen et al. |
| 2005/0266387 | A1 | 12/2005 | Rossides |
| 2006/0246410 | A1 | 11/2006 | Iwayama |
| 2008/0077416 | A1 | 3/2008 | Hetrick |
| 2008/0104065 | A1 | 5/2008 | Agarwal |
| 2009/0287678 | A1 | 11/2009 | Brown |
| 2010/0281091 | A1 | 11/2010 | Wakao |
| 2011/0066587 | A1 | 3/2011 | Ferrucci |
| 2011/0125734 | A1 | 5/2011 | Duboue |
| 2011/0125844 | A1 | 5/2011 | Collier |
| 2012/0065480 | A1 | 3/2012 | Badilini |
| 2012/0078837 | A1 | 3/2012 | Bagchi |
| 2012/0078873 | A1 | 3/2012 | Ferrucci |
| 2012/0078890 | A1 | 3/2012 | Fan |
| 2012/0191716 | A1 | 7/2012 | Omoigui |
| 2013/0007037 | A1 | 1/2013 | Azzam |
| 2013/0007055 | A1 | 1/2013 | Brown |
| 2013/0017524 | A1 | 1/2013 | Barborak |
| 2013/0018652 | A1 | 1/2013 | Ferrucci |
| 2013/0029307 | A1 | 1/2013 | Ni |
| 2013/0041921 | A1 | 2/2013 | Cooper |
| 2013/0052630 | A1 | 2/2013 | Mine |
| 2013/0066886 | A1 | 3/2013 | Bagchi |
| 2013/0097110 | A1 | 4/2013 | Kwon |
| 2013/0103382 | A1 | 4/2013 | Kim |
| 2013/0111348 | A1 | 5/2013 | Gruber |
| 2013/0218914 | A1 | 8/2013 | Stavrianou |
| 2013/0226453 | A1 | 8/2013 | Trussel |
| 2013/0304730 | A1 | 11/2013 | Zhou |
| 2014/0012909 | A1 | 1/2014 | Sankar |
| 2014/0058766 | A1 | 2/2014 | Yu |
| 2014/0058986 | A1 | 2/2014 | Boss |
| 2014/0172880 | A1 | 6/2014 | Clark et al. |
| 2014/0172882 | A1 | 6/2014 | Clark |
| 2014/0172883 | A1 | 6/2014 | Clark |
| 2014/0272884 | A1 | 9/2014 | Allen |
| 2014/0272909 | A1* | 9/2014 | Isensee .................... G09B 7/02 434/362 |
| 2014/0278378 | A1 | 9/2014 | Meliett |
| 2014/0280292 | A1 | 9/2014 | Skinder |
| 2015/0277996 | A1 | 10/2015 | Bank |
| 2015/0290531 | A1 | 10/2015 | Herz |
| 2015/0351655 | A1 | 12/2015 | Coleman |
| 2015/0356146 | A1 | 12/2015 | Yamashita |
| 2015/0356170 | A1 | 12/2015 | Allen et al. |
| 2016/0034457 | A1 | 2/2016 | Bradley et al. |
| 2016/0155058 | A1 | 6/2016 | Oh |
| 2016/0180294 | A1 | 6/2016 | Simon |
| 2016/0196299 | A1 | 7/2016 | Allen |
| 2016/0246929 | A1 | 8/2016 | Zenati |
| 2016/0342694 | A1 | 11/2016 | Allen |
| 2016/0342886 | A1 | 11/2016 | Allen et al. |
| 2016/0342900 | A1 | 11/2016 | Allen |
| 2017/0004204 | A1 | 1/2017 | Bastide et al. |
| 2017/0109390 | A1* | 4/2017 | Bradley ................ G06F 16/335 |
| 2017/0132313 | A1 | 5/2017 | Kukla |
| 2017/0147982 | A1 | 5/2017 | Reich |
| 2017/0161685 | A1 | 6/2017 | Jennings |
| 2018/0308473 | A1 | 10/2018 | Scholar |

FOREIGN PATENT DOCUMENTS

| | | | |
|---|---|---|---|
| JP | 2013050793 | A | 3/2013 |
| JP | 2016066232 | A | 4/2016 |
| WO | 2002/029618 | A1 | 4/2002 |
| WO | 2011/065617 | A1 | 6/2011 |
| WO | 2012/122196 | A2 | 9/2012 |
| WO | 2013/192584 | A1 | 12/2013 |

OTHER PUBLICATIONS

"List of IBM Patents or Patent Applications Treated as Related", Oct. 28, 2015, 2 pages.

"List of IBM Patents or Patent Applications Treated as Related", Aug. 12, 2015, 2 pages.

"Method and System for Managing Cases When an Answer Changes in a Question Answering System", IP.com, IP.com No. 000237471, Jun. 18, 2014, 3 pages.

High, Rob , "The Era of Cognitive Systems: An Inside Look at IBM Watson and How it Works", IBM Corporation, Redbooks, Dec. 12, 2012, 16 pages.

Magnini, Bernardo et al., "Is it the Right Answer? Exploiting Web Redundancy for Answer Validation", Proceedings of the 40th Annual Meeting of the Association for Computational Linguistics (ACL), Philadelphia, Jul. 2002, pp. 425-432.

Yuan, Michael J., "Watson and healthcare, How natural language processing and semantic search could revolutionize clinical decision support", IBM developerWorks, IBM Corporation, Apr. 12, 2011, 14 pages.

"Apache ODF Toolkit (incubating)", The Apache Software Foundation, http://incubator.apache.org/odftoolkit/odfdom/index.htmi, accessed online Mar. 12, 2015, 2 pages.

"Ignoring SSL certificate in Apache HttpClient 4.3", Stack Overflow, http://stackoverflow.com/questions/19517538/ignoring-ssl-certificate-in-apache-httpclient-4-3, accessed online Mar. 12, 2015, 5 pages.

"List of IBM Patents or Patent Applications Treated as Reiated", Jul. 15, 2015, 2 pages.

"Microsoft Office—Tools to Get Work Done", Microsoft Corporation, http://office.microsoft.com/en-us/, accessed online Mar. 12, 2015, 5 pages.

"Natural language processing", Wikipedia, http://en.wikipedia.org/wiki/Natural_language_processing, last modified Mar. 10, 2015, accessed online Mar. 12, 2015, 12 pages.

"Oracle Outside in Technology", Oracle Corporation, http://www.oracle.com/us/technologies/embedded/025613.htm, accessed online Mar. 12, 2015, 2 pages.

"SPSS Statistics", IBM Corporation, http://www-01.ibm.com/software/analytics/spss/products/statistics/, accessed online Mar. 12, 2015, 2 pages.

"SPSS Text Analytics for Surveys", IBM Corporation, http://www-01.ibm.com/software/analytics/spss/products/statistics/text-analytics-for-surveys/, accessed online Mar. 12, 2015, 2 pages.

Li, Fangtao et al., "Answer Validation by Information Distance Calculation", Coling 2008: Proceedings of the 2nd Workshop on Information Retrieval for Question Answering_(IR4QA), Aug. 2008, pp. 42-29.

(56) References Cited

OTHER PUBLICATIONS

McCord, M.C. et al., “Deep parsing in Watson”, IBM J. Res. & Dev. vol. 56 No. 3/4 Paper 3, May/Jul. 2012, pp. 3:1-3:15.
Oliver, Andrew et al., “Apache POI—the Java API for Microsoft Documents”, The Apache Software Foundation, http:/poi.apache.org/, accessed online Mar. 12, 2015, 2 pages.
“List of IBM Patents or Patent Applications Treated as Related”, May 10, 2019, 2 pages.

* cited by examiner

DISTRIBUTING UPDATED COMMUNICATIONS TO VIEWERS OF PRIOR VERSIONS OF THE COMMUNICATIONS

BACKGROUND

1. Technical Field

Present invention embodiments relate to communication systems, and more specifically, to distributing updated communications to viewers of prior versions of those communications.

2. Discussion of the Related Art

Communication or messaging systems may employ a plurality of channels to distribute messages. The channels may each be associated with an attribute (e.g., topic, etc.) and accessible by users with access rights to that channel. When a question is submitted in a channel of the communication system by a user requesting information, an answer to that question may have already been provided in another communication channel which may not be accessible to the requesting user. Although a search can be performed across a plurality of channels to identify an answer for the submitted question, a plurality of answers may be uncovered by the search. However, this requires examination of the content of the uncovered answers by the requesting user in order to select an optimal answer for the question which is a time-consuming process and violates access restrictions.

Further, an answer to a question submitted in a communication channel may have been previously provided in the same or different communication channel by a user responding to the question based on old information, thereby being wrong or incorrect. The responding user may correct an answer that the responding user previously submitted, or adapt that answer to the latest information in order to respond to a question. However, a another user that viewed the original answer cannot know that the answer has been updated by the responding user and, thus, information provided to the viewing user remains old.

SUMMARY

According to one embodiment of the present invention, a system distributes communications and includes at least one processor. The system identifies an answer to a question submitted to the system by a requesting user. A responding user is identified that submitted the identified answer to the system. The system enables the responding user to view the identified answer. In response to receiving a revision to the identified answer from the responding user, one or more users that have viewed the identified answer are determined and notified of the revision to the answer. Embodiments of the present invention further include a method and computer program product for distributing communications in substantially the same manner described above.

BRIEF DESCRIPTION OF THE DRAWINGS

Generally, like reference numerals in the various figures are utilized to designate like components.

DETAILED DESCRIPTION

Figure 1:
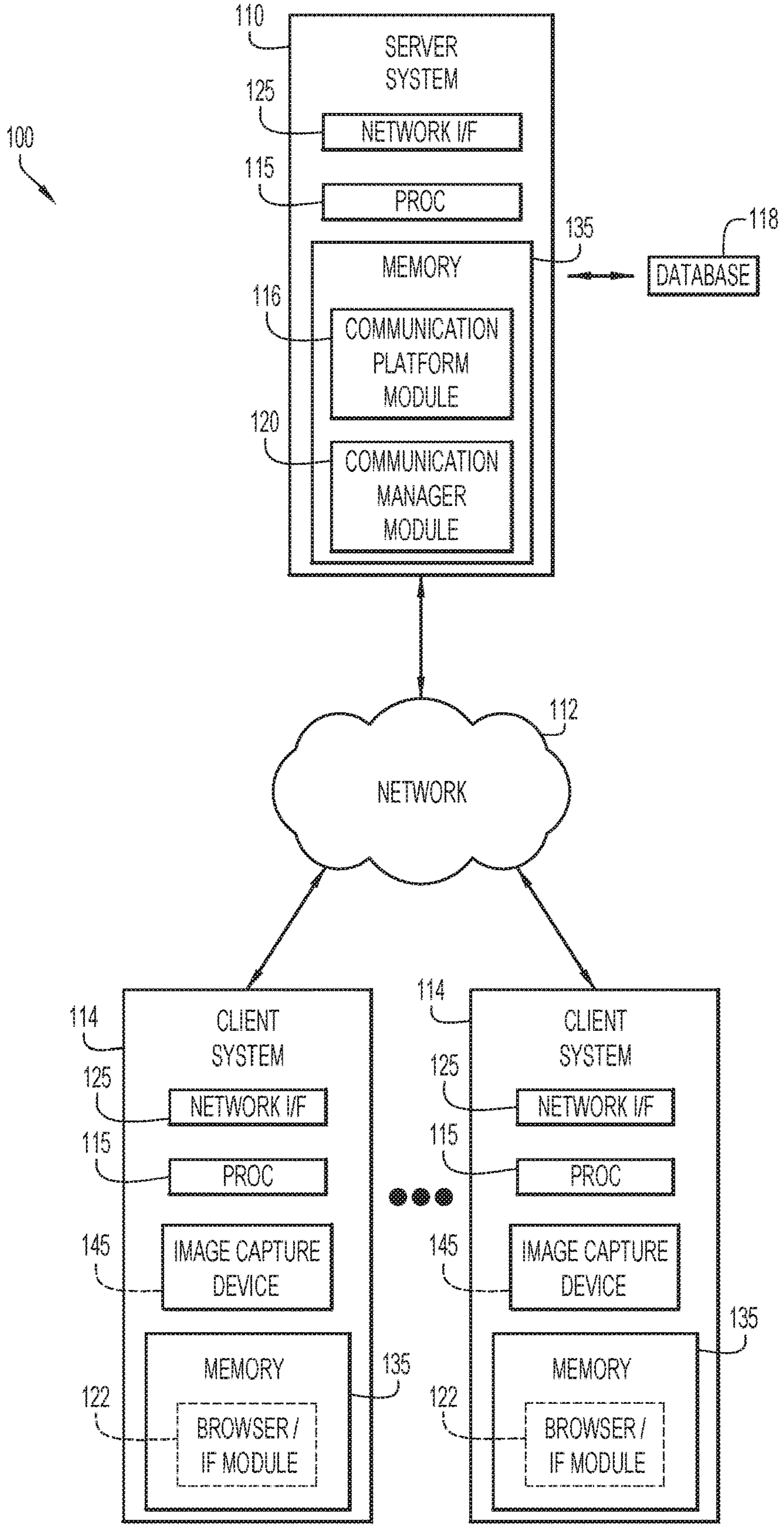
FIG. 1 is a diagrammatic illustration of an example computing environment according to an embodiment of the present invention.

An embodiment of the present invention may obtain questions and answers by analyzing content of a submission to a messaging or communication system, either on a regular basis or when an item or article (e.g. question, answer, etc.) is submitted. Characteristics of the questions and answers are extracted, where the characteristics may be a set of characteristic words (or keywords) obtainable through conventional or other techniques (e.g., term frequency-inverse document frequency (tf-idf), etc.). The questions and answers are registered in a database so that the answers are associated with corresponding questions, and identical or similar questions are also associated with one another. An answer is distributed and displayed for viewing by users, and a list of the users viewing the answer is stored. The list of viewing users may include viewing users that have clicked or actuated at least a portion of content of the answer, viewing users who have copied at least a portion of content of the answer, and/or viewing users that have gazed at content of the answer for a certain period of time. A number of positive reactions (e.g., "ThankYou", "thumbsup", etc.) to the answer from users submitting the question to request information and viewing users is stored and used to determine a reliability or confidence value for the answer. Certain operations (e.g., copy operation, etc.) of a viewing user may be treated as an implicit positive reaction, even if there is no other explicit positive reaction.

An embodiment of the present invention may extract keywords from a question submitted in a certain communication channel of a communication system or environment by a user requesting information, and retrieve similar questions registered in a database. A search is performed for answers to the original and similar questions. When answers are found during the search, an answer with high reliability is presented to the requesting user. The question associated with the answer may also be presented. When a plurality of answers are associated with the question, those answers may be presented together. A notification is sent to the responding user providing an answer to enable confirmation that the answer is correct. When the answer is confirmed as correct, the responding user typically decides or indicates not to revise the answer, which causes the communication system to notify the requesting user.

An embodiment of the present invention enables a responding user to revise and re-submit an answer as needed (e.g., update the submission). When the answer is re-submitted, the requesting user and past viewing users are notified of the revision. The responding user is allowed to specify the previous version of the answer as readable or not readable. An icon may be presented to publicize the revision. The icon may be configured to disappear after a certain period of time elapses.

When an answer is present in a communication channel in which the requesting user has not been registered as a member, an embodiment of the present invention enables the responding user to determine whether to allow the requesting user to participate in the communication channel. A notification is sent to the requesting user when participation is approved.

An example computing environment 100 for use with present invention embodiments is illustrated in FIG. 1. Specifically, computing environment 100 includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to interact with server systems 110 to communicate and revise messages (e.g., questions, answers, etc.). The server systems include a communication platform module 116 to provide a communication platform or communication environment for distributing communications, and a communication manager module 120 to manage communications including revisions or updates to communications, and notify users that have viewed the initial communications of the revisions. The communication manager module may be coupled to, or included within, communication platform module 116. A database system 118 may store various information for the analysis (e.g., associations between questions and answers, viewers of prior communications, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may include a browser/interface module 122 to interface with server systems 110 and present a graphical user (e.g., GUI, etc.) or other interface (e.g., command line prompts, menu screens, etc.) to solicit information from users pertaining to the desired communications.

Server systems 110 and client systems 114 may be implemented by any conventional or other computer systems preferably equipped with a display or monitor, a base, optional input devices (e.g., a keyboard, mouse or other input device), and any commercially available and custom software (e.g., server/communications software, communication platform module 116, communication manager module 120, browser/interface module 122, etc.). The base may preferably include at least one hardware processor 115 (e.g., microprocessor, controller, central processing unit (CPU), etc.), one or more memories 135, and/or internal or external network interfaces or communications devices 125 (e.g., modem, network cards, etc.). The client systems may further include an image capture device 145 (e.g., camera or other devices to capture still images, video, etc.).

Communication platform module 116, communication manager module 120, and browser/interface module 122 may include one or more modules or units to perform the various functions of present invention embodiments described below. The various modules (e.g., communication platform module 116, communication manager module 120, browser/interface module 122, etc.) may be implemented by any combination of any quantity of software and/or hardware modules or units, and may reside within memory 135 of the server and/or client systems for execution by a corresponding processor 115.

Figure 2:
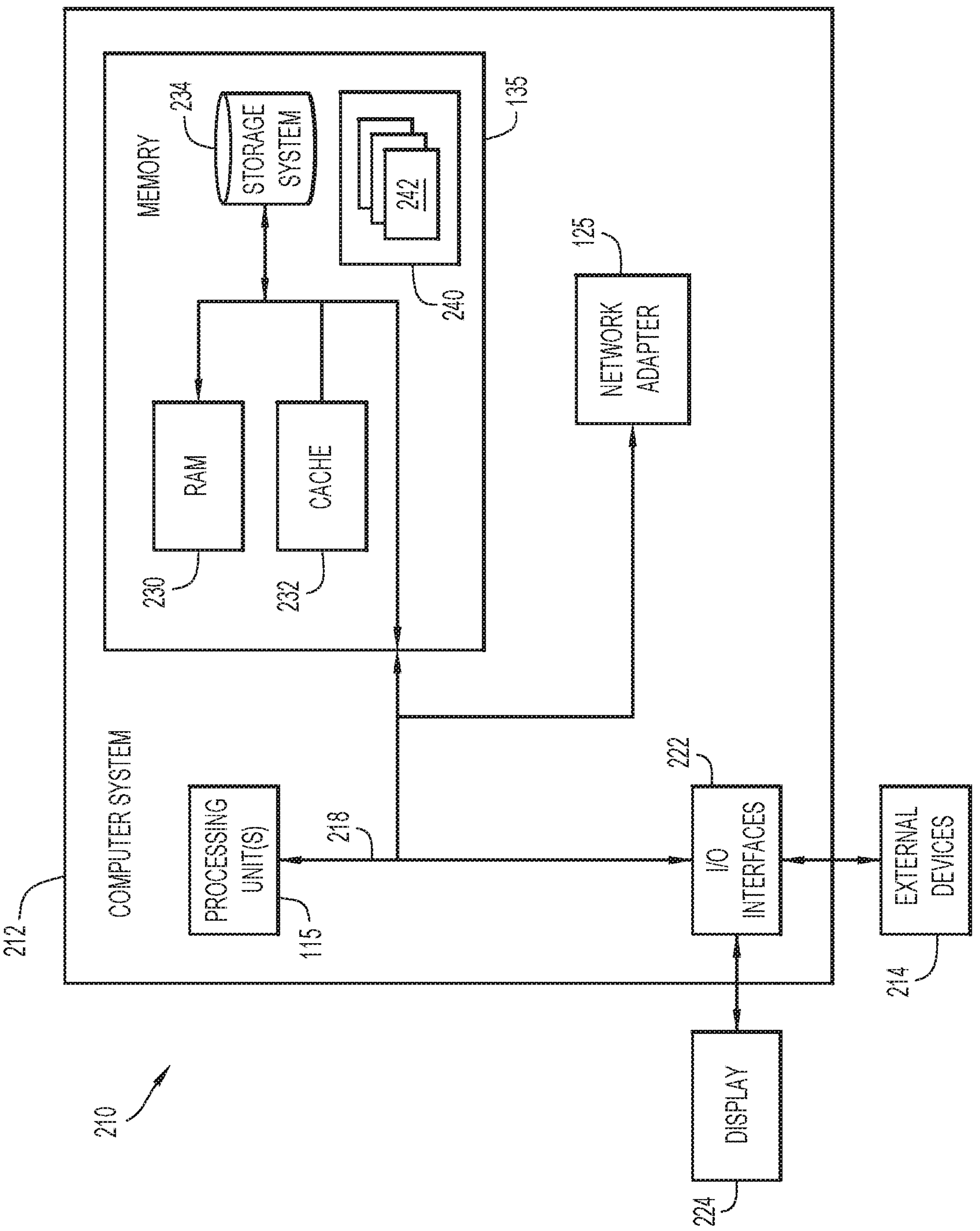
FIG. 2 is a block diagram of an example computing device according to an embodiment of the present invention.

Referring now to FIG. 2, a schematic of an example of a computing device 210 of computing environment 100 (e.g., that may implement server systems 110 and client systems 114) is shown. The computing device is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a general-purpose computing device. The components of computer system 212 may include, but are not limited to, one or more processors or processing units 115, system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one) of program modules that are configured to carry out the functions of embodiments of the invention.

Program/utility 240, having a set (at least one) of program modules 242 (e.g., communication platform module 116, communication manager module 120, browser/interface module 122, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
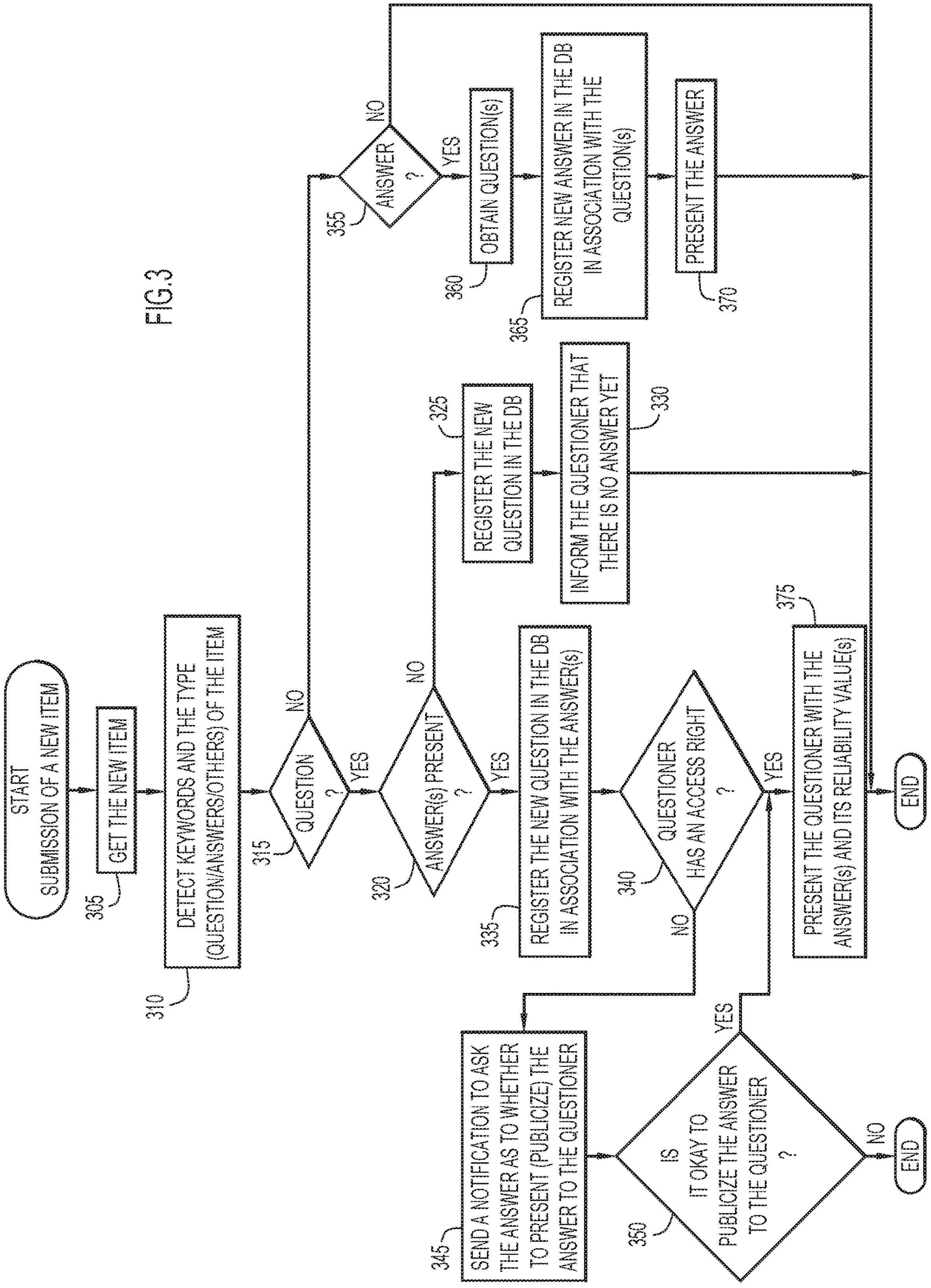
FIG. 3 is a procedural flowchart of a manner of processing an item submitted to a communication system according to an embodiment of the present invention.

A manner of processing an item submitted to the communication environment (e.g., via a server system 110 and a client system 114) according to an embodiment of the present invention is illustrated in FIG. 3. Initially, an item may be submitted through browser/interface module 122 of a client system 114 to the communication environment provided by communication platform module 116 of a server system 110 at step 305. The communication platform may provide any conventional or other communication environment for exchange of communications (e.g., messages, questions, answers, etc.). The communication environment may enable exchange of communications across different communication channels each associated with a corresponding attribute (e.g., topics, etc.) and access rights for users (e.g., users, user groups or subscribers, etc.). The item may be a communication including a question or an answer to a question, and may be provided within a communication channel of the communication environment.

The item is analyzed by communication manager module 120 at step 310 to detect keywords within the item and the type of item (e.g., question, answer, etc.). The keywords may be detected based on various characteristics (e.g., frequency of terms, etc.), and any conventional or other techniques may be employed to extract the keywords (e.g., term frequency-inverse document frequency (tf-idf), etc.). The keywords of the item are analyzed to determine the type of item (e.g., presence of words and/or symbols indicating a question, such as "Who", "What", "Where", When", "Why", a question mark symbol ("?"), etc., presence of words indicating an answer or response, such as words repeated from a question, specific nouns, punctuation, etc.).

The communication environment stores questions and corresponding answers in database system 118 in response to the items being submitted to the communication environment. This enables the communication environment to quickly provide answers to questions across communication channels (e.g., instead of waiting for submission of an answer in the particular communication channel), and to track users viewing answers and revisions to those answers for notifying the viewing users of the revisions as described below.

When the item is a question as determined at step 315, communication manager module 120 determines a presence of one or more answers for the question in database system 118 at step 320. For example, the keywords from the question are compared to keywords of other questions in database system 118 to identify virtually identical questions and corresponding answers. Various techniques may be used to compare the keywords (e.g., distances, quantity of matching or partially matching keywords, types of keywords matched, etc.) and determine virtually identical questions providing answers for the submitted question.

When an answer has not been submitted for the question (e.g., no matching questions exist in database system 118 with corresponding answers) as determined at step 320, communication manager module 120 registers the question in database system 118 at step 325, and notifies a requesting user submitting the question that an answer has not yet been received by the communication environment at step 330. A data structure 405 (FIG. 4) is generated for database system 118, and corresponding information for the question is stored in the data structure to register the question in the database system.

When one or more answers are identified within database system 118 as determined at step 320, communication manager module 120 registers the question in database system 118 at step 335 and associates the question with the identified answers in the database system. A data structure 405 (FIG. 4) is generated for database system 118, and corresponding information for the question and answers are stored in the data structure to register the question in the database system. The communication manager module further compares keywords of the question with keywords of other questions in database system 118 to identify related (or similar) questions and corresponding answers. Various techniques may be used to determine similarity of the keywords (e.g., distances, quantity of matching or partially matching keywords, types of keywords matched, etc.) and questions treated as related. The question is further associated with the related questions and answers in database system 118.

Communication manager module 120 determines access rights of the requesting user submitting the question with respect to the communication channels containing the answers. For example, an answer may have been submitted by a responding user in response to a virtually identical question in a different communication channel of the communication environment of which the requesting user is not a member (and lacks access).

When the requesting user does not have sufficient access rights to view the one or more answers as determined at step 340, communication manager module 120 sends a notification to the responding user requesting permission for distribution and presentation of the answer to the requesting user at step 345. In addition, the responding user may determine whether to allow the requesting user to become a member of, or participate in, the communication channel containing the answer at step 350. A notification is sent to the requesting user when participation for the communication channel containing the answer is approved.

When the requesting user has the appropriate access rights (as determined at step 340) or receives permission (as determined at step 350) to view the one or more answers, communication manager module 120 distributes the one or more answers and corresponding reliability or confidence values for the answers for presentation to the requesting user on a user interface generated by client system 114 at step 375. The reliability or confidence value for an answer is determined based on reactions to the answer as described below. In addition, answers to related questions and the related questions themselves may be presented. Icons may be presented to indicate the reliability of answers and whether the answer has been revised.

One or more answers with high reliability may be presented to the requesting user (e.g., a threshold number of answers with the highest reliability values, answers with reliability values above a threshold, etc.). The question associated with each answer may also be presented (e.g., in case of related questions). When a plurality of answers are associated with the question, those answers may be presented together.

When the item is an answer to a question as determined at step 355, communication manager module 120 ascertains one or more questions associated with the answer at step 360. This may be accomplished by searching database system 118 for corresponding questions based on various textual or other characteristics (e.g., identifiers when responding to a question, etc.). The answer is registered in database system 118 at step 365 and associated with the ascertained questions. The responding user submitting the answer may be provided an opportunity to revise the answer, and the revised answer may be registered in database system 118. The corresponding information for the answer (and revised answer) are stored in a data structure 405 (FIG. 4) associated with the question to register the answer (and revised answer) in the database system. The communication manager module distributes the answer for presentation to users associated with the ascertained questions at step 370. The communication manager module may further distribute the revised answer for presentation to users associated with the ascertained questions and/or users viewing the previously submitted answer.

In addition, user reactions to the answer are analyzed by communication manager module 120 to determine a reliability or confidence value for the answer that is stored with the answer in database system 118. For example, a number of positive reactions (e.g., "ThankYou", "thumbs up", "like", etc.) to the answer from the requesting user and other users viewing the answer is accumulated to determine the reliability or confidence value (e.g., total quantity of positive reactions, total quantity normalized to a score range, etc.). Certain operations (e.g., copy operation, etc.) of the requesting and viewing users may be considered as an implicit positive reaction (even in the absence of an explicit positive reaction).

Figure 4:
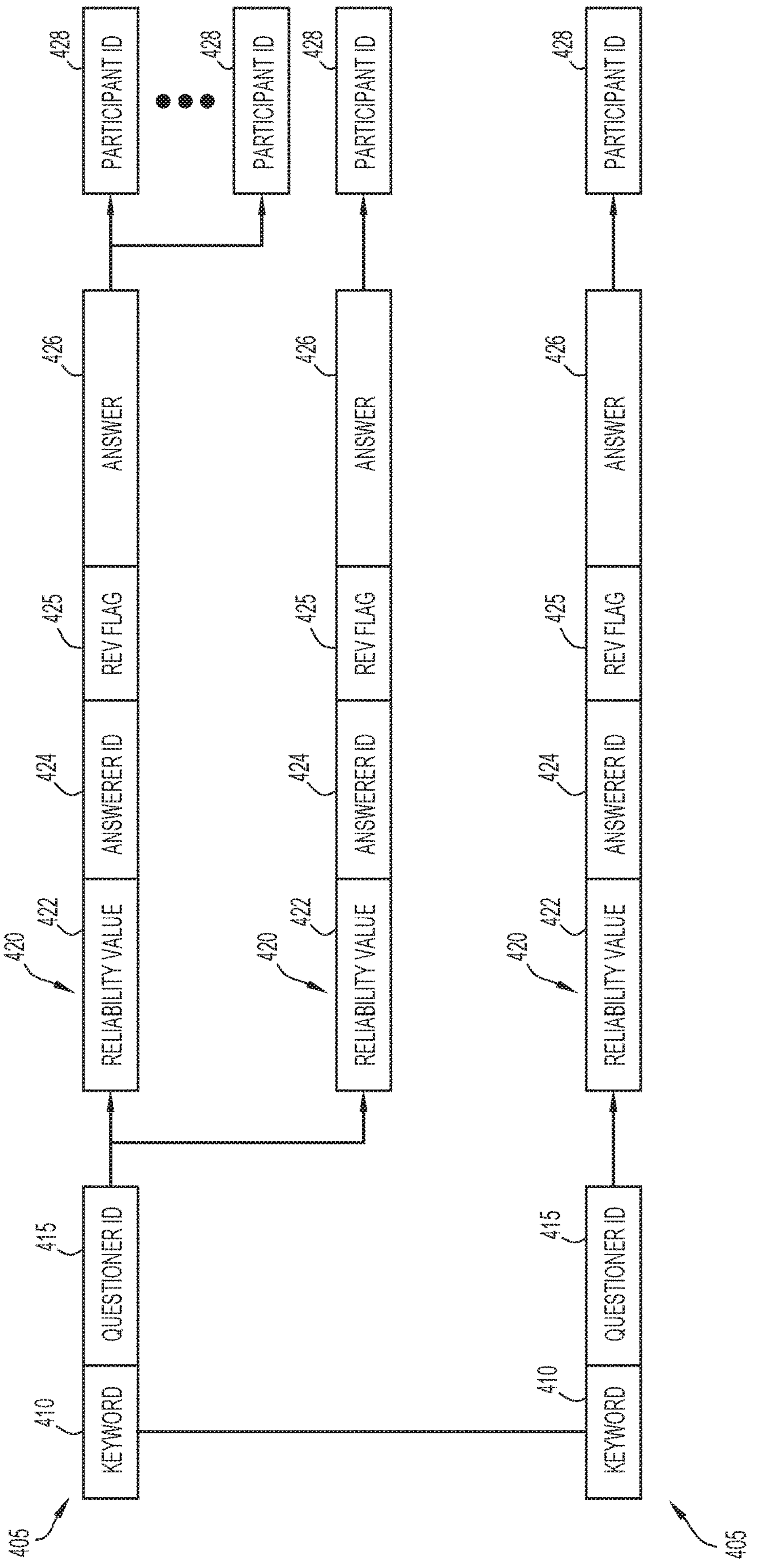
FIG. 4 is a schematic block diagram of an example architecture for a database system according to an embodiment of the present invention.

An example storage architecture for database system 118 according to an embodiment of the present invention is illustrated in FIG. 4. The database system may include a data structure 405 to store information pertaining to a corresponding question and one or more answers submitted to the communication environment. Data structure 405 may be implemented by any type of data structure to contain the information (e.g., object oriented data objects, database tables, linked lists, etc.). Data structure 405 includes a keyword field 410, a requesting user or questioner id field 415, an answer block 420, and a viewing user or participant id field 428. Keyword field 410 includes one or more keywords extracted for a corresponding question. These keywords may be compared to keywords from answers to associate an answer with a question.

Requesting user or questioner id field 415 includes an identifier of a requesting user submitting the question to request information. The identifier may be based on a user identification (e.g., user id, user name, user address, etc.) for accessing or communicating over the communication environment. Requesting user field 415 may be associated or linked to one or more answer blocks 420 each containing information pertaining to an answer for the question associated with data structure 405. Answer block 420 includes a reliability value field 422, a responding user or answerer id field 424, a revision flag field 425, and an answer field 426. Reliability value field 422 includes the reliability or confidence value for the answer, while responding user or answer id field 422 includes an identifier of a responding user submitting an answer to the question. The identifier may be based on a user identification (e.g., user id, user name, user address, etc.) for accessing or communicating over the communication environment.

Revision flag field 425 includes a revision flag indicating whether a revision has been provided for a corresponding answer. Answer field 426 includes the answer to the question, and may be associated or linked to one or more viewing user fields 428. Viewing user field 428 includes an identifier of a viewing user viewing or reading the answer in answer field 426. The identifier may be based on a user identification (e.g., user id, user name, user address, etc.) for accessing or communicating over the communication environment. The viewing user field is used to identify viewing users that have viewed or read the answer in order to be notified of updates or revisions to the answer as described below. Data structures 405 are generated, and the fields are provided with corresponding information as items are submitted to the communication environment to register the items with database system 118. Data structures 405 may be associated with or indicate the corresponding communication channels based on various identifiers (e.g., channel identifiers, identifier of the requesting user indicating communication channels of which the requesting user is a member, identifier of the responding users indicating communication channels of which the responding users are members, etc.).

Figure 5:
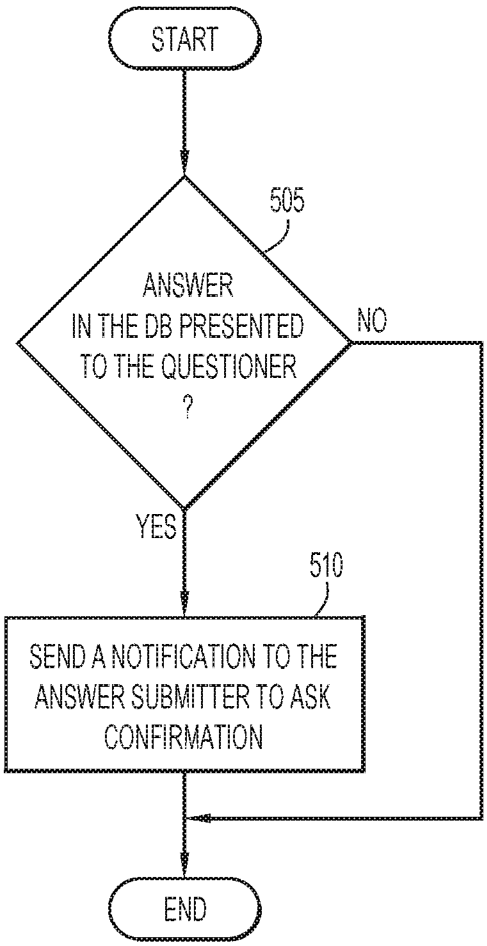
FIG. 5 is a procedural flowchart of a manner of presenting an answer to a question submitted to a communication system according to an embodiment of the present invention.

A manner of presenting an answer to a question (e.g., associated with step 375 of FIG. 3) according to an embodiment of the present invention (e.g., via a server system 110 and/or a client system 114) is illustrated in FIG. 5. Initially, a requesting user may have access rights to view the answer, or the responding user may provide permission for the requesting user to view the answer as described above. When the answer is to be distributed or presented to the requesting user as determined at step 505, communication manager module 120 sends a notification to the responding user to confirm the validity of the answer at step 510. Once the validity of the answer is confirmed, the answer may be distributed and presented to the requesting user with the corresponding reliability or confidence value for the answer on the user interface generated by a client system 114. Further, confirmation of the validity of the answer indicates a lack of revisions or updates by the responding user, and the requesting user is notified of the confirmation.

Figure 6:
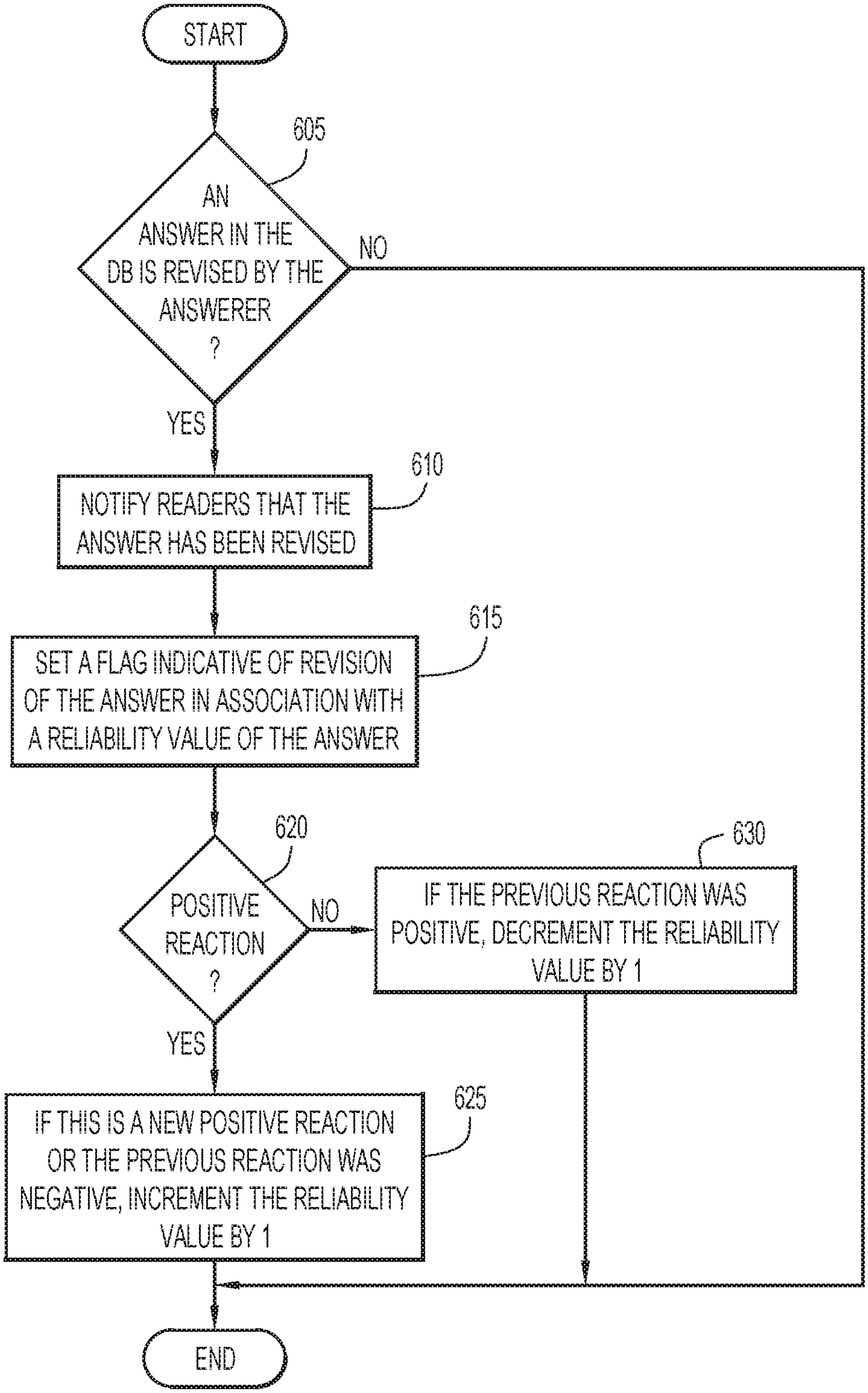
FIG. 6 is a procedural flowchart of a manner of revising an answer previously submitted to a communication system according to an embodiment of the present invention.

A manner of revising a previously submitted answer (e.g., associated with step 365 of FIG. 3) according to an embodiment of the present invention (e.g., via a server system 110 and/or a client system 114) is illustrated in FIG. 6. Initially, a responding user may be provided an opportunity to revise an answer previously submitted. This may be accomplished from a user interface (e.g., FIG. 9) or in response to a request for confirmation of validity of an answer. Once an answer is revised or updated as determined at step 605, communication manager module 120 registers the revised answer in database system 118 and determines viewing users that have viewed or read the previous version of the answer. In particular, database system 118 is searched to ascertain data structure 405 containing the previous version of the answer in answer field 426 (FIG. 4). Viewing user fields 428 of the ascertained data structure 405 associated with the previous version of the answer indicate identifiers of the viewing users that have viewed or read the previous version of the answer. These identifiers may be used to determine the viewing users that have viewed or read the previous version of the answer.

Further, a new answer block 420 is generated and associated or linked (e.g., via a pointer, identifier etc.) with the ascertained data structure for the previous version of the answer. The revised answer is stored in answer field 426 of the new answer block, and the identifier of the responding user providing the revised answer is stored in responding user field 424 of the new answer block.

Once the viewing users that have viewed or read the previous version of the answer have been identified, communication manager module 120 sends a notification to the identified viewing users that the answer has been updated or revised at step 610. The responding user may control (e.g., enable or prevent) distribution and/or presentation of the previous version of the answer to the identified users. For example, the responding user may designate the previous version of the answer as readable or not readable. Further, the revised answer may be presented with an icon to indicate the revision. The icon may no longer be displayed with the answer after a threshold period of time elapses (e.g., hours, days, weeks, months, years, etc.). A revision flag is set to a value (e.g., zero, one or other non-zero value, etc.) to indicate a revision to the answer at step 615. The revision flag is stored in revision flag field 425 of answer block 420 corresponding to the previous version of the answer to indicate that the previous version of the answer has been revised. The revision flag further indicates that a corresponding reliability value may reflect the prior version of the answer (instead of the revised answer).

Users viewing the revised answer may provide feedback or reactions to the revised answer that enable adjustment of the reliability or confidence value for the revised answer (e.g., initially set to a value (e.g., zero, etc.), the reliability value of the previous version of the answer, etc.). Viewing user fields 428 associated with answer field 426 of new answer block 420 containing the revised answer are updated to store the viewing users viewing the revised answer (e.g., for subsequent revisions). When a positive reaction to the revised answer is received as determined at step 620, communication manager module 120 adjusts the reliability value of the revised answer at step 625. The reliability value for the revised answer indicates a greater reliability when a new positive reaction is received, or a negative reaction was previously received (e.g., when the reaction of a user changes from negative to positive for the revised answer). The reliability value may be adjusted for each positive reaction of a user as described above in various manners to indicate a greater reliability (e.g., increment the reliability value by any increment (e.g., one, etc.), change an indication from low to high, etc.). The adjusted reliability value is stored in reliability value field 422 of new answer block 420 for the revised answer.

When a negative reaction to the revised answer is received as determined at step 620, communication manager module 120 adjusts the reliability value of the revised answer at step 630. The reliability value for the revised answer indicates a lesser reliability when a positive reaction was previously received (e.g., when the reaction of a user changes from positive to negative for the revised answer). The reliability value may be adjusted for each negative reaction of a user as described above in various manners to indicate a lesser reliability (e.g., decrement the reliability value by any increment (e.g., one, etc.), change an indication from high to low, etc.). The adjusted reliability value is stored in reliability field 422 of new answer block 420 for the revised answer.

Figure 7:
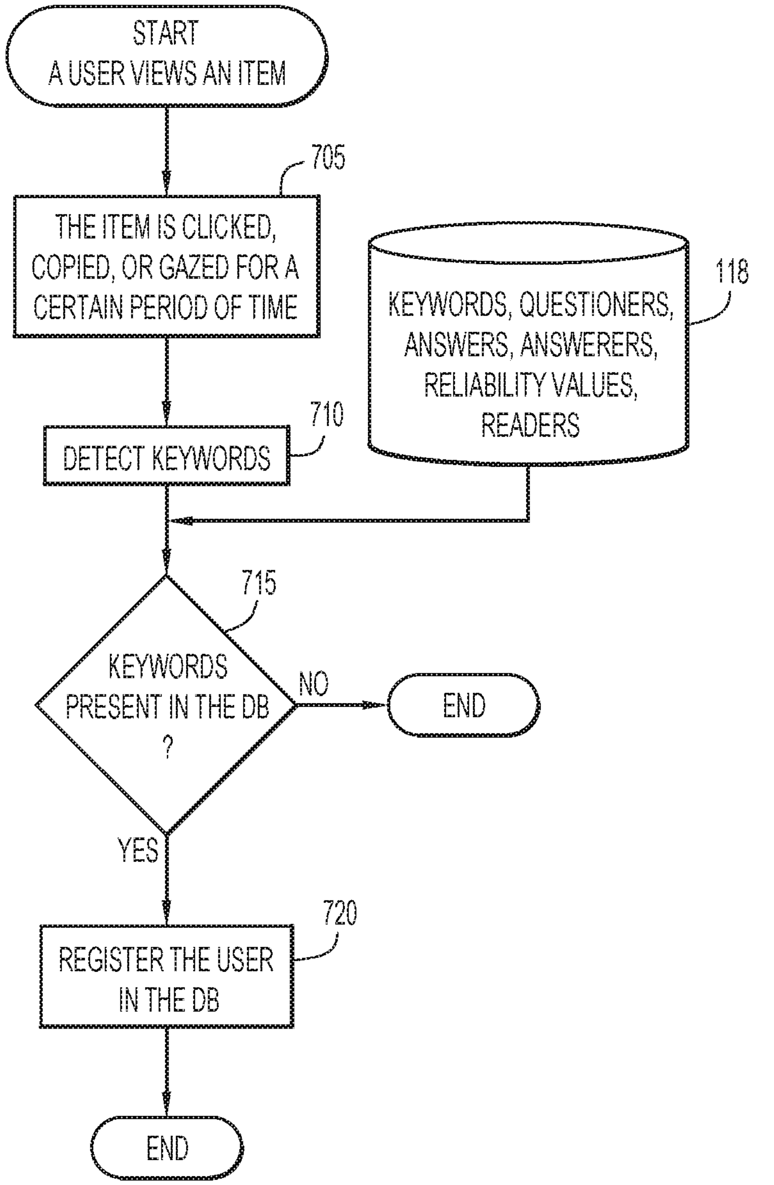
FIG. 7 is a procedural flowchart of a manner of identifying a user viewing an answer submitted to a communication system according to an embodiment of the present invention.

A manner of identifying a user viewing an item (e.g., associated with step 610 of FIG. 6) according to an embodiment of the present invention (e.g., via a server system 110 and/or a client system 114) is illustrated in FIG. 7. Initially, a requesting or responding user may provide an item (e.g., question, answer, etc.) in the communication environment from a user interface of a client system 114. The item may be viewed by various viewing users having sufficient access rights to the item or to the communication channel of the communication environment containing the item. Communication manager module 120 detects actions initiated for the item by users to determine viewing users reading or viewing the item at step 705. For example, communication manager module 120 may receive notifications of input device manipulations (e.g., mouse clicks or other actions detected on client system 114) to view or copy at least a portion of the item. Further, a client system 114 may utilize camera or other image capture device 145 to detect a user gaze and measure an amount of time a user gazes at an item. The image capture device may capture one or more images over time, and conventional or other image processing techniques may be employed by communication manager module 120 to identify head and/or eye position from the captured images and determine the location of the user gaze. When the user gazes at the item for a sufficient amount or period of time (e.g., relative to a time threshold, such as a number of seconds, a minute, etc.), the user is considered to have read or viewed the item.

The viewed item is analyzed by communication manager module 120 at step 710 to detect keywords within the item. The keywords may be detected based on various characteristics (e.g., frequency of terms, etc.), and any conventional or other techniques may be employed to extract the keywords (e.g., term frequency-inverse document frequency (tf-idf), etc.).

Database system 118 is searched at step 715 to identify one or more data structures 405 with keywords (e.g., of questions and/or answers) matching the detected keywords from the viewed item. When the data structures are identified, the users viewing or reading the item (or the user identifiers) are added to data structure 405 in the corresponding viewing user fields 428 at step 720. This enables the viewing users to be notified in response to modification of answers associated with the identified data structures as described above (e.g., FIG. 6).

Figure 8:
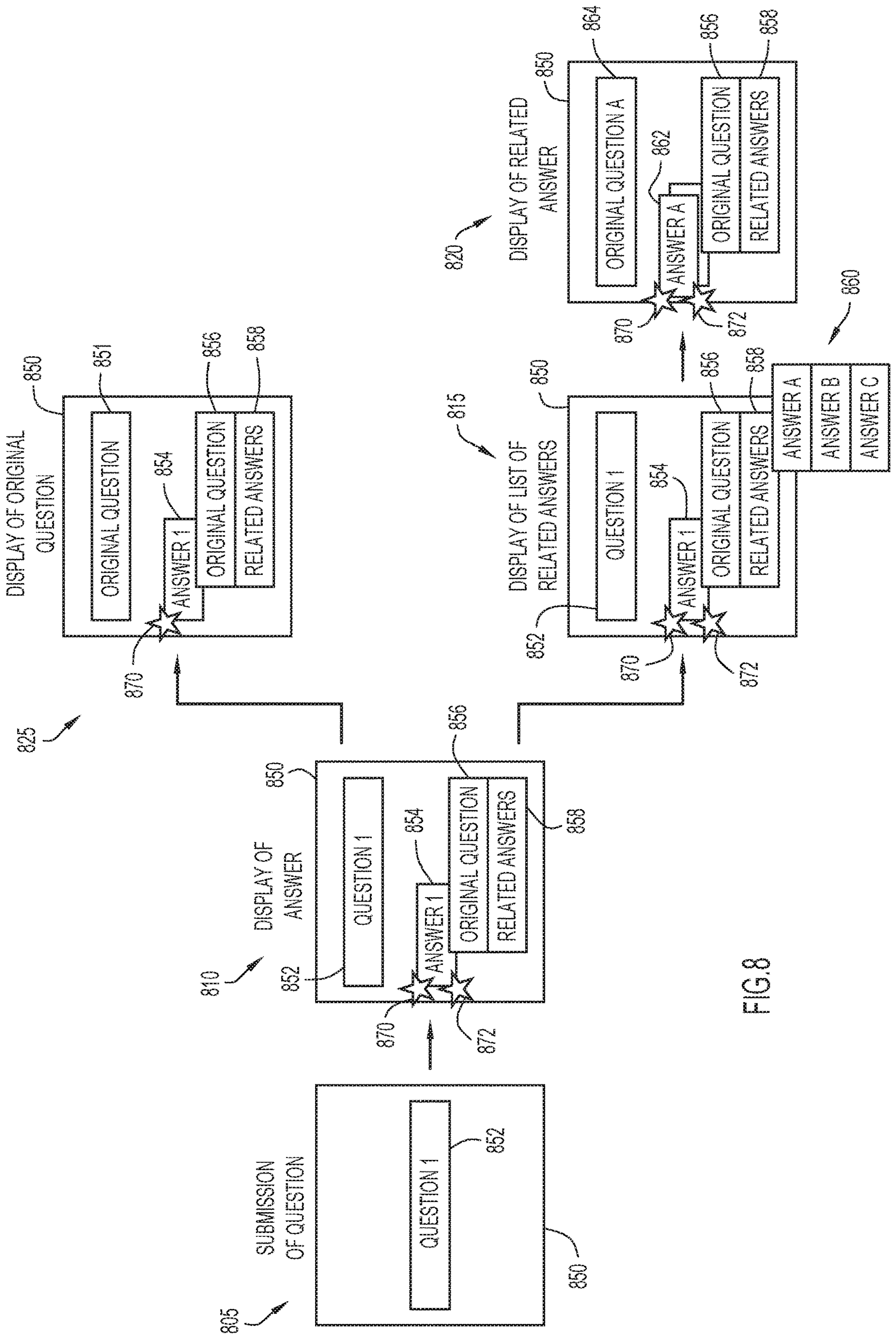
FIG. 8 is a flow diagram of example user interface screens for submitting a question to a communication system and receiving answers according to an embodiment of the present invention.

A flow diagram of example user interface screens for submitting a question and receiving answers (e.g., via a server system 110 and a client system 114) according to an embodiment of the present invention is illustrated in FIG. 8. Initially, a requesting user may utilize a user interface screen 850 generated by communication manager module 120 and presented by a client system 114 to submit a question 852 (e.g., Question 1 as viewed in FIG. 8) at flow 805. The user interface screen may be arranged in any fashion and enable the user to create or select the question to be submitted. An answer 854 to the question (e.g., Answer 1 as viewed in FIG. 8) may be retrieved from database system 118 as described above and displayed on user interface screen 850 at flow 810. An icon 870 may be displayed to indicate a reliability of the answer in accordance with the associated reliability value, while an icon 872 may be displayed to indicate a presence of a revision of the answer based on the revision flag. Icon 872 may no longer be displayed with a revised answer after a threshold period of time elapses (e.g., hours, days, weeks, months, years, etc.).

Interface screen 850 may further include original question button or other actuator 856 and related answers button or other actuator 858 to indicate the presence of related questions and answers. In response to actuating related answer button 858 on interface screen 850, answers of related questions are retrieved from database system 118 and a list of related answers 860 is presented on the user interface screen for selection of a desired answer (e.g., Answer A, Answer B, and Answer C as viewed in FIG. 8) at flow 815. The related answers may be ascertained from data structures 405 of questions linked to the data structure of submitted question 852.

When an answer 862 (e.g., Answer A as viewed in FIG. 8) is selected from list 860, the selected answer and corresponding original question 864 (e.g., Original Question A as viewed in FIG. 8) for the answer are retrieved from database system 118 and presented on user interface screen 850 at flow 820. Icon 870 for the selected answer may be updated to reflect the reliability value for the selected answer. The icon for the reliability value may vary to indicate different levels or degrees of reliability (e.g., color coding, numerical indication of reliability, textual indication of reliability, etc.).

When original question button 856 is actuated at flow 810, an original question 851 associated with displayed answer 854 (e.g., Answer 1 as viewed in FIG. 8) is presented on user interface screen 850 at flow 825. Original question 851 may be originally submitted question 852. Alternatively, original question 851 may be a question associated with answer 854 retrieved from database system 118 (in case answer 854 is associated with a question that is different than, but virtually identical to, question 852). The virtually identical question may be displayed in place of, or in combination with, originally submitted question 852.

Figure 9:
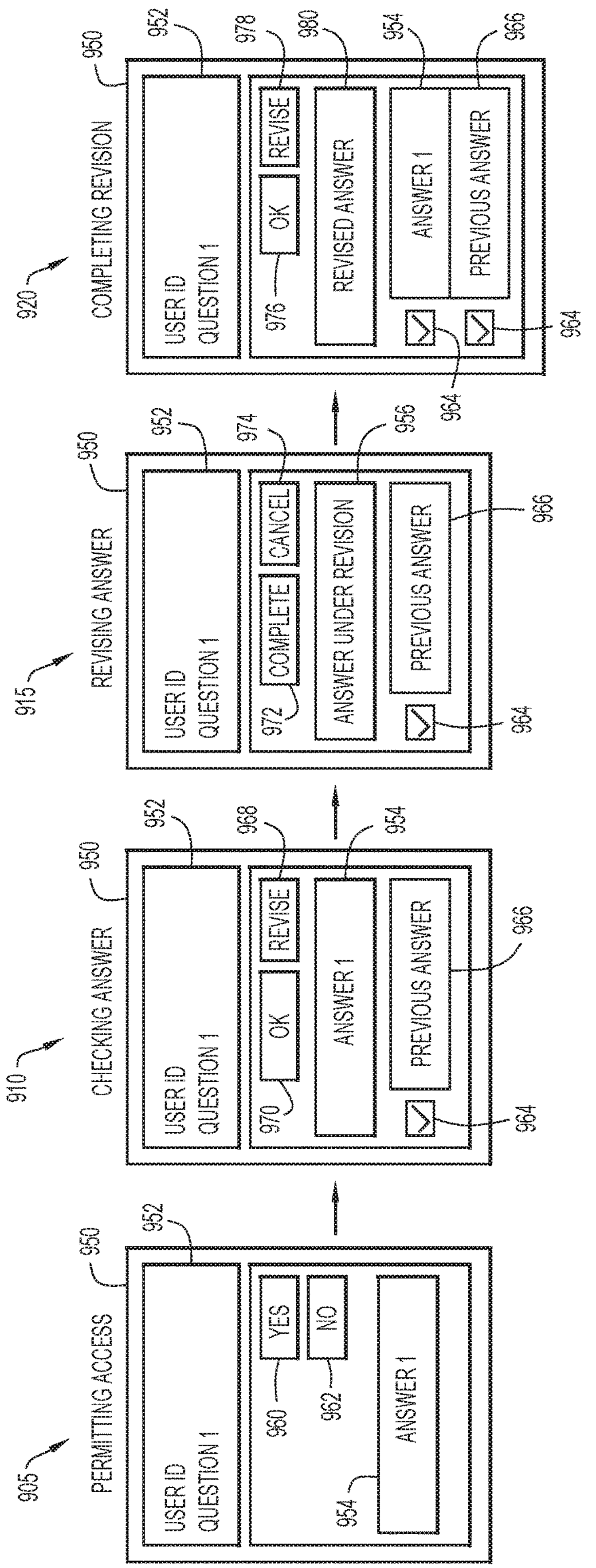
FIG. 9 is a flow diagram of user interface screens for presenting and revising answers to questions in a communication system according to an embodiment of the present invention.

A flow diagram of example user interface screens for presenting and revising answers to questions (e.g., via a server system 110 and a client system 114) according to an embodiment of the present invention is illustrated in FIG. 9. Initially, a user may utilize a user interface screen 950 generated by communication manager module 120 and presented by a client system 114 to submit an answer 954 (e.g., Answer 1 as viewed in FIG. 9) to a question 952 (e.g., Question 1 as viewed in FIG. 9) at flow 905. Question 952 is submitted by a user associated with the presented user identification. The user interface screen may be arranged in any fashion and enable the user to provide an answer to the question. Interface screen 950 includes buttons or other actuators 960 and 962. Button 960 (e.g., YES button as viewed in FIG. 9) provides permission for the requesting user to access the answer, while button 962 (e.g., NO button as viewed in FIG. 9) denies permission for the requesting user to access the answer.

In response to actuation of button 960 to provide permission for access to answer 954, the answer and a previous version of the answer 966 to the question may be displayed on user interface screen 950 at flow 910. The previous version of the answer may be retrieved from data structure 405 of database system 118 associated with the question corresponding to answer 954. A check box 964 or other actuator may be presented on interface screen 950 adjacent previous version of the answer 966 to control distribution and presentation of the previous version of the answer to the requesting user. Interface screen 950 further enables revision of answer 954 by buttons or other actuators 968, 970. Button 968 (e.g., Revise button as viewed in FIG. 9) enables entry of a revision to answer 954, while button 970 (e.g., OK button as viewed in FIG. 9) enables answer 954 and previous version of the answer 966 (e.g., when enabled by check box 964) to be accessed by the requesting user.

In response to actuation of button 968 to revise answer 954, user interface screen 950 provides a field 956 to enable entry of revisions to answer 954 at flow 915. User interface screen 950 further includes buttons or other actuators 972, 974. Button 972 (e.g., Complete button as viewed in FIG. 9) enables submission of the revised answer, while button 974 (e.g., Cancel button as viewed in FIG. 9) enables the revision to be canceled. In response to cancellation of the revision, processing returns to flow 910 to enable another revision or submission of the answer to the requesting user as described above.

In response to actuation of button 972 to enable submission of the revision, user interface screen 950 presents question 952, a revised answer 980, initial answer 954, and previous version of the answer 966 at flow 920. In this case, a new answer block 420 is generated for revised answer 980, and associated with question 952 in database system 118 as described above. The revision flag is set in revision flag field 425 associated with answer 954 to indicate that answer 954 has a revision. Check box 964 or other actuator may be presented adjacent each of answer 954 and previous version of the answer 966 to control distribution and presentation of these versions of the answers to the requesting user.

Interface screen 950 further includes buttons or other actuators 976, 978. Button 978 (e.g., Revise button as viewed in FIG. 9) enables entry of a revision to revised answer 980 (e.g., as described above for flow 910). Button 976 (e.g., OK button as viewed in FIG. 9) enables revised answer 980, and answers 954 and 966 (e.g., when enabled by check box 964) to be accessed by the requesting user. In addition, viewing users that have viewed answer 954 and/or previous version of the answer 966 may be determined from database system 118 and notified of revised answer 980. The revised answer may be distributed and presented to the viewing users.

It will be appreciated that the embodiments described above and illustrated in the drawings represent only a few of the many ways of implementing embodiments for distributing updated communications to viewers of prior versions of the communications.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, communication platform module 116, communication manager module 120, browser/interface module 122, etc.). These systems may include any types of monitors and input devices (e.g., keyboard, mouse, voice recognition, etc.) to enter and/or view information.

It is to be understood that the software (e.g., communication platform module 116, communication manager module 120, browser/interface module 122, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communication platform module 116, communication manager module 120, browser/interface module 122, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., answers, questions, user identifiers, revisions, reliability values, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., answers, questions, revisions, permissions, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for distribution of updates for any communications in any type of communication or message exchanging system (e.g., forums, threads, question/answer systems, etc.). The system may employ any quantity of communication channels, where each channel may be associated with any quantity of attributes (e.g., topics, specific groups of users/subscribers, etc.). The channels may have any desired access rights or permissions which may be provided on any basis (e.g., per user, per user group, etc.).

The questions, answers, and/or revisions may be of any type, quantity or format. Any desired similarity criteria and corresponding thresholds may be utilized to determine corresponding and related questions in the database (e.g., distance measures, whole or partial matching of terms, whole or partial matching of keywords, etc.).

The data structure may include any quantity of any types of fields arranged in any fashion to contain any types of data (e.g., alphanumeric, numeric, character, etc.). The data structures and/or fields may be associated or linked in any fashion (e.g., pointers, identifiers, etc.). The icons may be of any type, shape, color, or format to provide an indication of a revision, or a level of reliability of an answer. The reliability value may be determined based on any types of reactions (e.g., positive, negative, neutral, etc.), including explicit or implicit. An explicit reaction may include any feedback from a user viewing an answer (e.g., like, thumbsup, content of a response, etc.). An implicit reaction may include any action performed by a user with respect to the answer (e.g., copy, delete, or other operation, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of distributing communications comprising:
- identifying, via a processor, an answer to a question submitted to a communication system, wherein the question is submitted to the communication system by a requesting user;
- identifying, via the processor, a responding user that submitted the identified answer to the communication system;
- enabling, via the processor, the responding user to view the identified answer; and
- in response to receiving a revision to the identified answer from the responding user:
  - determining, via the processor, one or more users other than the responding user that have viewed the identified answer by detecting interaction of the one or more users with the identified answer; and
  - notifying, via the processor, the determined one or more users of the revision to the answer.

2. The method of claim 1, wherein in response to receiving a confirmation of the identified answer from the responding user, distributing, via the processor, the identified answer to the requesting user.

3. The method of claim 1, further comprising:
- determining, via the processor, a reliability value for the identified answer based on a quantity of positive reactions to the identified answer on the communication system.

4. The method of claim 1, wherein the question is submitted in a first communication channel of the communication system, and the identified answer is submitted in a second different communication channel of the communication system for which the requesting user lacks access, and wherein enabling the responding user to view the identified answer further comprises:
- granting permission for the requesting user to access the second different communication channel to view the identified answer.

5. The method of claim 1, wherein determining one or more users other than the responding user that have viewed the identified answer further comprises:
- detecting one of actuation of at least a portion of content of the identified answer, copying of at least a portion of the identified answer, and gazing at the identified answer for a period of time.

6. The method of claim 1, wherein questions and associated answers submitted to the communication system are stored in a repository, and the method further comprises:
- identifying one or more related answers to the submitted question in the repository, wherein the one or more related answers correspond to questions similar to the submitted question; and
- distributing the one or more related answers to the requesting user.

7. The method of claim 1, wherein questions and associated answers submitted to the communication system are stored in a repository, and wherein identifying the answer to the question submitted to the communication system further comprises:
- searching the repository to determine a stored question corresponding to the submitted question; and
- identifying a stored answer associated with the determined question as the answer to the submitted question.

8. A system for distributing communications comprising:
- at least one processor configured to:
  - identify an answer to a question submitted to the system, wherein the question is submitted by a requesting user;
  - identify a responding user that submitted the identified answer to the system;
  - enable the responding user to view the identified answer; and
  - in response to receiving a revision to the identified answer from the responding user:
    - determine one or more users other than the responding user that have viewed the identified answer by detecting interaction of the one or more users with the identified answer; and
    - notify the determined one or more users of the revision to the answer.

9. The system of claim 8, wherein in response to receiving a confirmation of the identified answer from the responding user, the at least one processor is further configured to distribute the identified answer to the requesting user.

10. The system of claim 8, wherein the at least one processor is further configured to:
- determine a reliability value for the identified answer based on a quantity of positive reactions to the identified answer.

11. The system of claim 8, wherein the question is submitted in a first communication channel, and the identified answer is submitted in a second different communication channel for which the requesting user lacks access, and wherein enabling the responding user to view the identified answer further comprises:

granting permission for the requesting user to access the second different communication channel to view the identified answer.

12. The system of claim 8, wherein determining one or more users other than the responding user that have viewed the identified answer further comprises:

detecting one of actuation of at least a portion of content of the identified answer, copying of at least a portion of the identified answer, and gazing at the identified answer for a period of time.

13. The system of claim 8, wherein questions and associated answers submitted to the system are stored in a repository, and wherein identifying the answer to the question submitted to the system further comprises:

searching the repository to determine a stored question corresponding to the submitted question;

identifying a stored answer associated with the determined question as the answer to the submitted question; and identifying one or more related answers to the submitted question in the repository, wherein the one or more related answers correspond to questions similar to the submitted question;

and wherein the at least one processor is further configured to:

distribute the one or more related answers to the requesting user.

14. A computer program product for distributing communications, the computer program product comprising one or more non-transitory computer readable storage media collectively having program instructions embodied therewith, the program instructions executable by a processor to cause the processor to:

identify an answer to a question submitted to a communication system, wherein the question is submitted to the communication system by a requesting user;

identify a responding user that submitted the identified answer to the communication system;

enable the responding user to view the identified answer; and in response to receiving a revision to the identified answer from the responding user:

determine one or more users other than the responding user that have viewed the identified answer by detecting interaction of the one or more users with the identified answer; and notify the determined one or more users of the revision to the answer.

15. The computer program product of claim 14, wherein in response to receiving a confirmation of the identified answer from the responding user, the program instructions further cause the processor to distribute the identified answer to the requesting user.

16. The computer program product of claim 14, wherein the program instructions further cause the processor to:

determine a reliability value for the identified answer based on a quantity of positive reactions to the identified answer on the communication system.

17. The computer program product of claim 14, wherein the question is submitted in a first communication channel of the communication system, and the identified answer is submitted in a second different communication channel of the communication system for which the requesting user lacks access, and wherein enabling the responding user to view the identified answer further comprises:

granting permission for the requesting user to access the second different communication channel to view the identified answer.

18. The computer program product of claim 14, wherein determining one or more users other than the responding user that have viewed the identified answer further comprises:

detecting one of actuation of at least a portion of content of the identified answer, copying of at least a portion of the identified answer, and gazing at the identified answer for a period of time.

19. The computer program product of claim 14, wherein questions and associated answers submitted to the communication system are stored in a repository, and the program instructions further cause the processor to:

identify one or more related answers to the submitted question in the repository, wherein the one or more related answers correspond to questions similar to the submitted question; and distribute the one or more related answers to the requesting user.

20. The computer program product of claim 14, wherein questions and associated answers submitted to the communication system are stored in a repository, and wherein identifying the answer to the question submitted to the communication system further comprises:

searching the repository to determine a stored question corresponding to the submitted question; and identifying a stored answer associated with the determined question as the answer to the submitted question.

* * * * *